(12) United States Patent
Bolz et al.

(10) Patent No.: US 7,714,544 B2
(45) Date of Patent: May 11, 2010

(54) SWITCHING DEVICE FOR BI-DIRECTIONALLY EQUALIZING CHARGE BETWEEN ENERGY ACCUMULATORS AND CORRESPONDING METHODS

(75) Inventors: Stephan Bolz, Pfatter (DE); Rainer Knorr, Regensburg (DE); Günter Lugert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 1070 days.

(21) Appl. No.: 10/574,732

(22) PCT Filed: Sep. 1, 2004

(86) PCT No.: PCT/EP2004/051989

§ 371 (c)(1),
(2), (4) Date: Apr. 6, 2006

(87) PCT Pub. No.: WO2005/035317

PCT Pub. Date: Apr. 21, 2005

(65) Prior Publication Data

US 2008/0238527 A1   Oct. 2, 2008

(30) Foreign Application Priority Data

Oct. 6, 2003   (DE) ................ 103 46 325

(51) Int. Cl.
*H01M 10/46* (2006.01)
(52) U.S. Cl. .................. 320/166
(58) Field of Classification Search ........ 320/104, 320/127, 135, 137, 166, 167, DIG. 34, DIG. 36
See application file for complete search history.

(56) References Cited

U.S. PATENT DOCUMENTS

| 4,487,457 | A | 12/1984 | Janutka |
| 5,446,365 | A | 8/1995 | Nomura et al. |
| 5,977,652 | A | 11/1999 | Frey et al. |
| 6,232,674 | B1 | 5/2001 | Frey et al. |
| 6,472,854 | B2 | 10/2002 | Ootani |
| 6,919,648 | B2 | 7/2005 | Bolz et al. |
| 7,096,757 | B2 | 8/2006 | Albinsson |
| 2001/0004205 | A1 | 6/2001 | Miller |
| 2004/0140139 | A1 | 7/2004 | Malik |

(Continued)

FOREIGN PATENT DOCUMENTS

DE   19628222 A1   1/1998

(Continued)

*Primary Examiner*—Edward Tso
(74) *Attorney, Agent, or Firm*—Laurence A. Greenburg; Werner H. Stemer; Ralph E. Locher

(57) ABSTRACT

A switching device for bi-directionally equalizing charge between energy accumulators, particularly between capacitive energy accumulators in a motor vehicle electric system, includes: an integrated starter generator; a first connection coupled to the integrated starter generator; a second connection coupled to an energy source; a controllable transfer gate having a first load current-conducting path connected between the first and second connection, and a controllable switching controller having a second load current-conducting path connected between the first and second connection in parallel to the first load current-conducting path. There is also provided a motor vehicle electric system with such a switching device, and the implementation and use of a switching controller in a transfer gate for such a switching device.

41 Claims, 7 Drawing Sheets

U.S. PATENT DOCUMENTS

2005/0162144 A1 * 7/2005 Kernahan .................. 323/300

FOREIGN PATENT DOCUMENTS

| DE | 19645944 A1 | 5/1998 |
| --- | --- | --- |
| DE | 100 42 414 A1 | 3/2002 |
| DE | 100 42 524 A1 | 3/2002 |
| EP | 1091490 A2 | 4/2001 |
| EP | 1 424 494 A1 | 6/2004 |
| GB | 2 373 648 A | 9/2002 |
| JP | 59106874 A | 6/1984 |
| JP | 04185239 A | 7/1992 |
| JP | 05328533 A | 12/1993 |
| JP | 08223925 A | 8/1996 |
| JP | 11330376 A | 11/1999 |
| JP | 2001298945 A | 10/2001 |
| JP | 2002091577 A | 3/2002 |
| JP | 2002315225 A | 10/2002 |
| JP | 2002368593 A | 12/2002 |
| JP | 2003134797 A | 5/2003 |
| JP | 2003179472 A | 6/2003 |
| WO | 02066192 A1 | 8/2002 |
| WO | WO 02/066293 A1 | 8/2002 |

* cited by examiner

SWITCHING DEVICE FOR BI-DIRECTIONALLY EQUALIZING CHARGE BETWEEN ENERGY ACCUMULATORS AND CORRESPONDING METHODS

BACKGROUND OF THE INVENTION

Field of the Invention

The invention relates to a switching device for bidirectionally equalizing charge between energy accumulators, especially between capacitive energy accumulators in a motor vehicle electrical system provided with an integrated starter-generator. The invention further relates to a motor vehicle electrical system with such a switching device, a method for operating the switching device as well as to the use of a switching controller in a switch.

Previously motor vehicles used a vehicle electrical system with a system voltage of 14 V, which enables a charge voltage for the accumulator of 12 V to be implemented. The output power here is usefully limited for technical reasons to a maximum of 2 KW, since otherwise currents which are too great would flow in the electrical system. With a 14 V vehicle electrical system voltage, although the starter-generator can start the internal combustion engine and supply the electrical loads during the journey, power of more than 2 KW is required for further functions such as boost (acceleration) or recuperation (regenerative braking). This power can only be achieved with a higher vehicle electrical system voltage and thereby with a higher electrical power in the motor vehicle. Thus future vehicle electrical systems are to be equipped with a higher vehicle electrical system voltage of for example 42 V (this corresponds to a charge voltage of the accumulator of 36 V), so that around three times the power is available with the same current.

Different forms of a generator mounted directly on the crankshaft have been developed as primary energy sources, which—in a reversal of its principle of operation—can also be used as and electric motor and thereby as a starter for supporting the internal combustion engine. This generator is referred to as an integrated starter-generator (ISG). When operated in generating mode, the ISG allows electrical power to be generated and when operated in motor mode it enables mechanical drive power to be generated. In addition to the significantly increased power compared to known 2 KW generators (around 6 KW for an ISG) and in addition to its original function such as engine starting and electrical system supply, an ISG provides the following additional functions:

Boost (acceleration): Torque support for the internal combustion engine during the acceleration phase of the motor vehicle. The ISG has a maximum torque of around 200 Nm, which approximately corresponds to the torque of an internal combustion engine. During the boost process, currents of up to 270 A are needed for around 10-15 seconds to provide this torque.

Recuperation (regenerative braking): The ISG dissipates kinetic energy during vehicle braking by power generation. In this case currents of up to 270 A are created for up to 30 seconds which are again stored in the form of electrical energy.

Stop and go (engine shutdown when the vehicle is stopped, fast start of the internal combustion engine on restart).

Model computations and measurements on test vehicles have produced fuel savings of over 20% when the ISG is used in city traffic or with a corresponding driving cycle when utilizing the above new functions. If the ISG is essentially to be used for the fuel saving function, the motor vehicle electrical system must be in a position to provided significant power over the short term or store it again. With peak currents of 800 A this involves power in the range of 10 KW. Conventional 14 V starter batteries (accumulators), as well as future 42 V starter batteries are however not able to provide such high peak currents or to accept them again. When other accumulator types are used, for example nickel-cadmium batteries, nickel-metal-hydride batteries or lithium-ion batteries, such high peak currents can under some circumstances be accommodated. However such battery types do not meet or only inadequately meet other requirements for the electrical system, such as a high cycle strength for example. In particular current battery types must be designed to handle 300,000 to 500,000 charge and discharge cycles, as are typical for the boost and recuperation function of the ISG. Such high changes of cycle cannot be handled by current known battery types (accumulators) for motor vehicle applications.

Only a few energy accumulators are in any position to provide the required high cycle number or the high energy throughput—for 200.000 boost processes a total of appr. 12.6 MWh of energy or appr. 180,000 Ah are needed. Only Double-Layer Capacitors (DLC) have proved for a variety of reasons to be suitable energy accumulators for the fuel saving functions described above. Double-layer capacitors are able to store the high energy converted on boost and recuperation and output it again. The currents occurring in such cases also do not present any problems for double-layer capacitor functions. Because of their very high efficiency there is also very little self-heating and thereby a long life expectancy. The limited energy accumulator capacity of a double-layer capacitor however makes an additional accumulator, for example a simple lead-acid accumulator, necessary. This accumulator is not subject to a cyclic load from the frequent cycle changes so that a relatively long lifetime is to be expected by today's standards.

A disadvantage in the use of double-layer capacitors as energy accumulators however lies in the fact that an exchange of energy at the capacitor is necessarily also associated with a voltage change. To move 75% of the charge, the capacitor voltage must be varied by 50%. For a 42 V vehicle electrical system this would for example mean a voltage variation of 21 V to 42 V in the fully charged state. However such a voltage variation is not acceptable for a motor vehicle electrical system, since this system requires a voltage which is as stable as possible.

02/066192 A1 describes a motor vehicle electrical system in which the ISG is dynamically connected to the 42 V vehicle electrical system and the double-layer capacitor by means of a number of power switches. In the normal driving mode these connecting switches embodied as power switches connect the ISG and 42 V vehicle electrical system to each other. Only for the duration of the fuel saving functions, which can typically last a maximum of 10 seconds, are the ISG and the double-layer capacitor connected to each other. In this way it can be guaranteed that the 42 V vehicle electrical system and the double-layer capacitor are always physically separated, so that different voltage potentials have no role to play here either.

The main emphasis in implementing the connecting switch between ISG and 42 V vehicle electrical system or double-layer capacitor respectively is primarily on the controlled switch-on of the connecting switches, since two very low-resistance energy sources are connected to each other in each case with a smoothing capacitor at the ISG and the 42 V battery or with the smoothing capacitor and the double-layer capacitor. To implement a fuel saving function which is a great as possible, the connecting switches are controlled so that a required charge equalization can be undertaken in a very well controlled manner where possible.

The vehicle electrical system described in 02/066293 A1 is designed for the optimum fuel saving function. With many applications the vehicle electrical system, in addition to its fuel saving function—especially electrical boost support—must additionally meet other requirements. Thus in many applications, especially for high-priced motor vehicles, driving convenience also has an especially great role to play. The need thus arises to find a synthesis between the two requirements of the greatest possible driving comfort and the highest possible fuel savings.

This is best achieved by the energy recovered during regenerative braking and stored in the double-layer capacitor being fed directly to the 42 V vehicle electrical system where necessary. However the double-layer capacitor is no longer separated from the 42 V vehicle electrical system, but would—even for only short time—be directly connected to it. This is to be avoided however. In order on the one hand to provide a physical separation between double layer capacitor and 42 V vehicle electrical system and on the other hand to meet the requirement of directly feeding the stored energy of the double layer capacitor where necessary back into the 42 V vehicle electrical system, an expansion of the functionality of at least one of the connection switches between ISG and 42 V vehicle electrical system or double-layer capacitor respectively is required.

SUMMARY OF THE INVENTION

The object of the present invention is thus to specify a switching device which is as simple as possible which allows such feeding back of the energy recovered by the double-layer capacitor into the vehicle electrical system and which still allows a physical separation between double-layer capacitor and vehicle electrical system.

In accordance with the invention this object is achieved by a switching device with the features of claim 1. Furthermore a motor vehicle electrical system with the features of claim 20, a method with the features of claim 26 and an application with the features of claim 37 are provided.

The idea underlying the present invention consists of using at least one transferred gate which exhibits an expanded functionality as a connection switch. Such a transfer gate is arranged between the vehicle electrical system and the double-layer capacitor or and also between one of these elements and the starter-generator. The transfer gate provides an especially efficient solution for separating the vehicle electrical system and the double-layer capacitor and for connecting these elements to the starter-generator. As a result of the high currents the transfer gate consists of a parallel circuit of two controllable power switches connected in series in each case. Their source connections are connected to each other each case. The important factor here is that at least one branch of the transistors switched in parallel, that is one of the series circuits, is embodied as a switching controller which can be operated bidirectionally. Advantageously this switching controller is embodied as a downward controller. The expanded functionality of the transfer gate is thus produced by providing an additional switching controller of which the load path is arranged in parallel to the load paths of the transfer gates, as well as an activation circuit for activation of the transfer gate and of the switching controller.

The power switches of the inventive switching device are advantageously embodied as power MOSFETs, JFETs, thyristors, IGBTs or such like would also be conceivable.

The inventive transfer gate now allows an equalization of the charge between the intermediate circuit capacitor and the double-layer capacitor or between the intermediate circuit capacitor and the battery which is advantageously equipped with an optimum efficiency. The inventive transfer gate thus allows typical efficiencies of 85% to be implemented. By contrast, with previous applications, for example conventional transfer gates without switching controllers or power switches, efficiencies of up to only 50% can be implemented, since around 50% of the charge difference was converted into heat in the connection switches or in the power resistor respectively.

Using the inventive switching device with expanded transfer gates also allows discharging of the double-layer capacitor down to the voltage level of the 42 V vehicle power system. This is also desirable in order to enable the energy recovered on regenerative braking to be fed back into the vehicle electrical system for an internal combustion engine when idling.

Advantageously a recharging of the double-layer capacitor up to the voltage level of the vehicle electrical system is possible. This is also desirable in order to recharge for example a double-layer capacitor which has become discharged after several weeks during which the vehicle has been stopped and to start the vehicle using the charged-up double-layer capacitor.

The inventive solution is also economical to the extent that its allows a current equalization for currents of around 30 A to appr. 100 A and with the transfer gate activated allows switch currents of up to appr. 1,000 A. The power transistors of the switching controller or of the transfer gate in this case carry a partial current, so that a multiple use of these transistors is advantageously implemented here.

Preferably the starter-generator is connected to rotate in a fixed manner with the drive train, but it can also be belt driven.

Advantageous embodiments and developments of the invention are produced from the further subclaims as well as from the description which refers to the drawings.

The invention is described in more detail below on the basis of the exemplary embodiments specified in the schematic figures of the drawing. The drawing shows:

DESCRIPTION OF THE INVENTION

Figure 1:
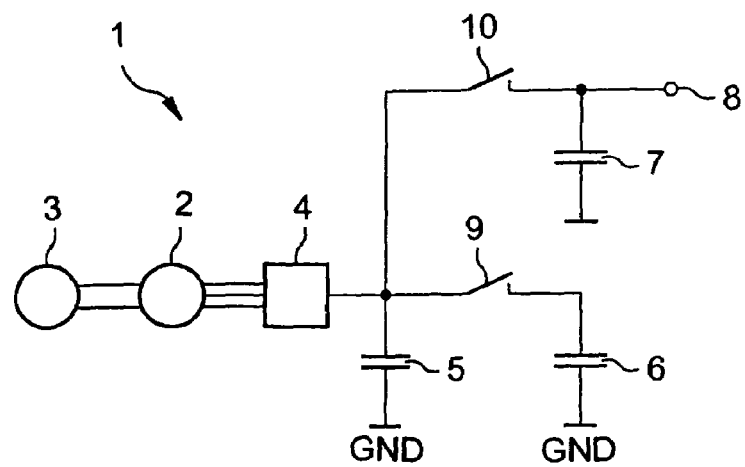
FIG. 1 a basic circuit diagram of an inventive motor vehicle electrical system, in which the function of a connecting switch is replaced by an inventive switching device with expanded transfer gate.

In all Figures of the drawing the same elements and signals or those with the same function—unless otherwise specified—have been provided with the same reference symbols.

FIG. 1 shows a basic circuit diagram of an inventive motor vehicle electrical system, in which the function of a connection switch is replaced by an inventive switching device with expanded transfer gate.

Reference symbol 1 in FIG. 1 designates the motor vehicle electrical system. The motor vehicle electrical system 1 consists of an integrated starter-generator 2—referred to below by the abbreviation ISG—which is coupled mechanically to an internal combustion engine 3. The ISG is an asynchronous machine which is connected via a bidirectionally operable AC/DC converter 4 and an intermediate circuit capacitor 5 to a power supply. The power supply consists on the one hand of a double-layer capacitor 6—designated below by the abbreviation DLC capacitor—and on the other hand of an accumulator 7, at which a voltage of 36/42 V is present (rated voltage 36 V, in the fully charged state 42 V). From this accumulator 7 loads can be fed directly via an output 8. The said voltage of 36/42 V is present at output 8. The DLC capacitor 6 is connected via a first switch 9 to the ISG 2, the accumulator 7 is connected via a second switch 10 to the ISG. With suitable activation of these controllable switches 9, 10, energy stored in the DLC capacitor 6 can be fed into the accumulator 7.

Under normal driving conditions the ISG 2 of the internal combustion engine 3 will be driven and thus operates in generator mode. Under such conditions it charges the energy accumulator with energy, which can occur under normal driving conditions at low power. In the recuperation mode this charging up is undertaken at increased power, corresponding the maximum power output of the ISG 2. For a 6-KW ISG 2 this means a maximum charge current of over 250 A.

This basic layout of such a motor vehicle electrical system with ISG and double-layer capacitor is already described in 02/066192 A1 cited at the start, which as regards the general layout and functioning of a motor vehicle electrical system, ISGs, double layer capacitors and the switch, is fully included as regards contents in the present patent application.

In accordance with the invention at least one of the controlled switches 9, 10 is now embodied as an inventive switching device with a transfer gate, switching controller and expanded functionality. The inventive switching device thus initially has the function of a controlled switch. In addition— as will be explained below in greater detail—the switching process is controlled by the switching device, especially as regards the voltage dropping over the switch, so that the switching-related losses remain low or a conventional energy flow from the double-layer capacitor 6 to the accumulator 7 and vice-versa is possible.

Figure 2:
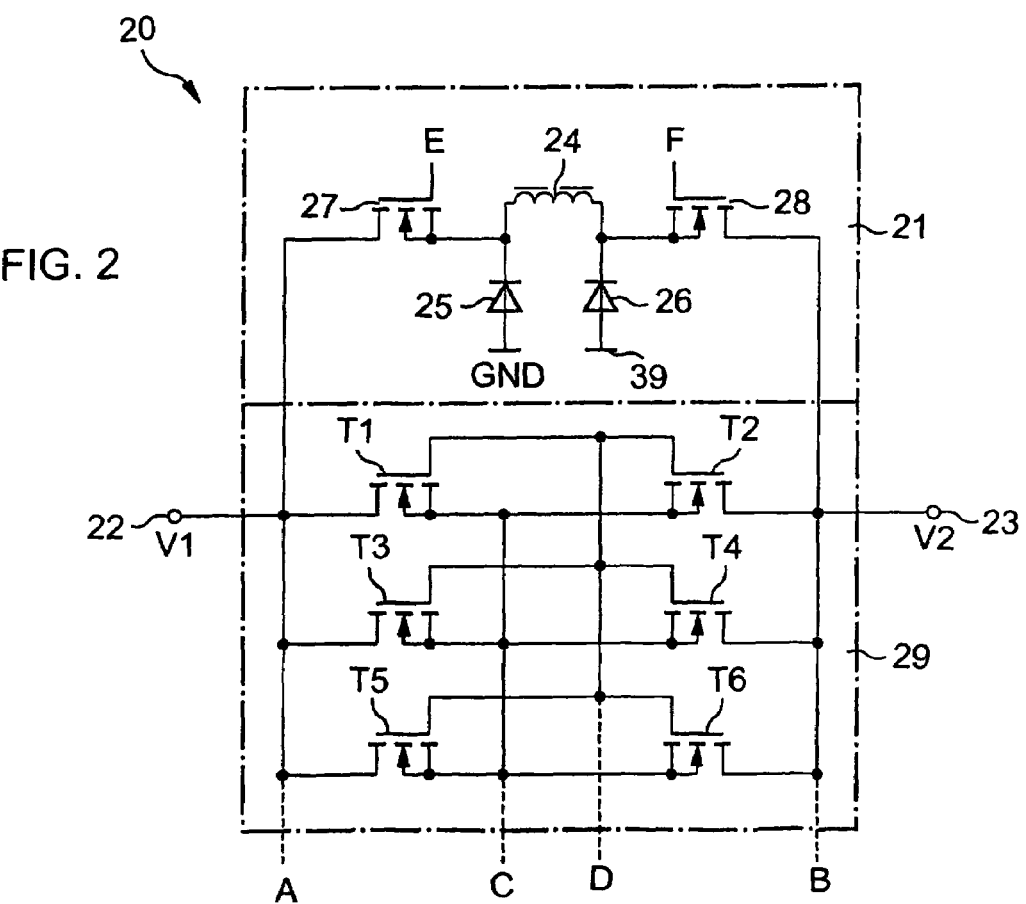
FIG. 2 with reference to of a circuit diagram, a simplified exemplary embodiment of an inventive transfer gate expanded by a switching controller for an inventive switching device.

FIG. 2 shows a circuit diagram of a simplified exemplary embodiment of an inventive transfer gate expanded by a switching controller for an inventive switching device.

The inventive switching device identified by reference symbol 20 contains a switching controller 21 as well as a transfer gate arranged in parallel to this. This parallel circuit comprising switching controller 21 and transfer gate 29 is arranged between a first terminal 22 and a second terminal 23. These two terminals 22, 23, depending on the direction in which a current is to be switched, can be operated both as an input terminal and as an output terminal. In the present exemplary embodiment terminal 22 is operated as input terminal and terminal 23 as output terminal.

During operation of the inventive switching device 20 a first potential V1 is present as the input terminal 22 and a second potential V2 at the output terminal 23, so that the differential voltage Vdiff=V2−V1 is present between the terminals 22, 23 and thereby across the switching device 20.

The inventive transfer gate 20 consists of a parallel circuit of two power MOSFETs T1-T6 connected to each other in series. Such a transistor pair defines a load path, so that the transfer gate 29 is constructed from the parallel connection of a number of such load paths. The two power MOSFETs T1-T6 of a relevant load path are short circuited to each other via their gate terminals and their source terminals. The respective drain terminals of the power MOSFETs T1-T6 are connected either to the input terminal 22 or the output terminal 23. The series circuit of two power MOSFETs T1-T6 of a relevant load path is produced by the corresponding series-connected links of these transistors T1-T6. The reason for a series circuit is that the leading sign of the voltage at the opened power MOSFET is not defined and the substrate diode of one of these power MOSFETs T1-T6 respectively is polarized in the on-state direction. Depending on application and requirement the three parallel-switched load paths of the transfer gate 29 at the terminals A-D can be expanded by further branches with power MOSFET pairs.

The switching controller 21 consists of two power transistors 27, 28, which are activated via their gate terminals E, F. The precise activation of these power MOSFETs 27, 28 will be described in greater detail below. The controlled links of the power MOSFETs 27, 28 are coupled to each other via a choke 24, for example a coil or a such an inductive element. The source terminals of the transistors 27, 28 are further connected in each case via a free-wheeling diode 25, 26 to a reference potential GND. The drain-side terminals of the transistors 27, 28 are connected to the terminals 22, 23.

Figure 3:
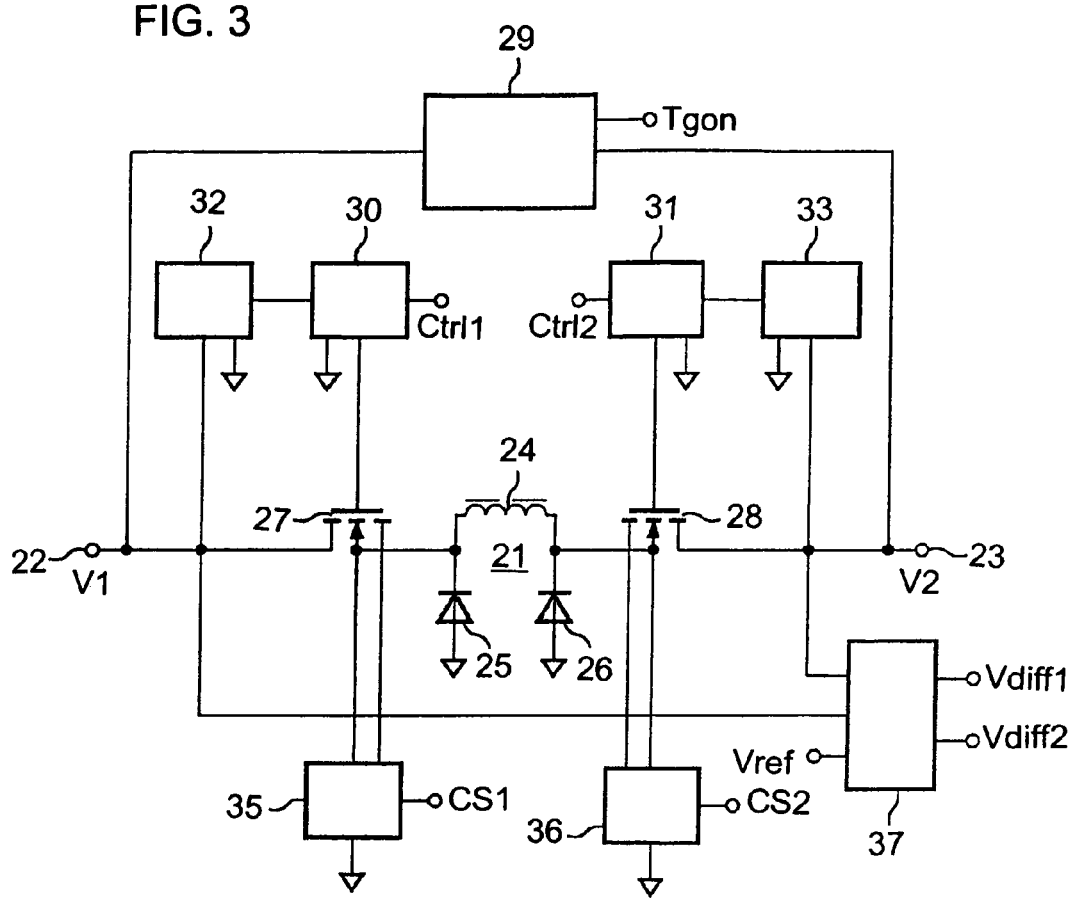
FIG. 3 a block diagram of an inventive switching device with a transfer gate and a switching controller from FIG. 2 as well as an activation circuit for activation of the switching controller and further functional units.
Figure 3:
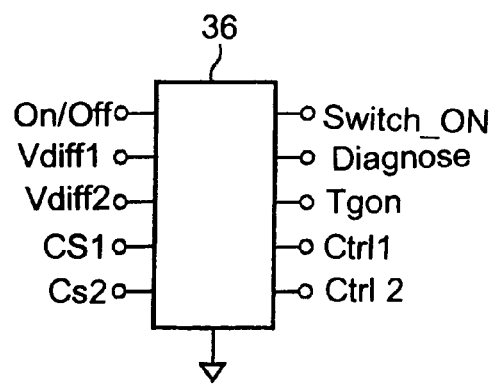

FIG. 3 shows a block diagram of an inventive switching device with a transfer gate and a switching controller from FIG. 2 as well as an activation circuit for activation of the switching controller and transfer gate and further functional units.

A central element of the inventive switching device 20 is a control device 36 which serves to control or regulate the function of the switching controller 21 and thus monitors its switching processes. The control unit 36 can for example be embodied as a program-controlled device, for example as a microcontroller or microprocessor. Controlled by an external "On/Off" signal the control unit 36 opens or closes the connection between the terminals 22, 23. In response to this "On/Off" signal, the control unit 36 delivers the signal "Switch ON" to an external control unit (not shown) when the required switching state of the switching controller 21 is reached. It further creates a further "diagnosis" signal, which is used to monitor the overall function of the switching controller 21. This "diagnosis" signal is expandable up to the point of detailed error analysis.

The switching controller 21 consists of a number of functional groups which are mostly arranged symmetrically to the inductor 24. In this case the gate terminals of the power MOSFETs 27, 28 are connected to gate controllers 30, 31. For control of the power MOSFETs 27, 28 these gate controllers 30, 31 are fed control signals Ctrl1, Ctrl2 of the control unit 36. The gate controller 30, 31 controls the power MOSFETs 27, 28 as a function of signals Ctrl1, Ctrl2, so that one of these power MOSFETs 27, 28 in each case is switched on or switched off by the clock of the signals Ctrl1, Ctrl2.

The power MOSFETs 27, 28 are embodied as N-channel MOSFETs in the present exemplary embodiment. A gate potential above the drain potential and thereby above a potential of a signal V1, V2 connected in via the terminals 22, 23 is thus needed to switch on the transistors 27, 28. For these purposes an auxiliary power source 32, 33 is provided for each of the power MOSFETs 27, 28, which is connected to the relevant gate controllers 30, 31 and which provides the relevant gate potential for activation of the transistors 27, 28.

Furthermore current measurement devices 35, 36 are provided which are connected to the substrate terminals and source terminals of the power MOSFETs 27, 28 and which are designed to measure a current in the load path of these power MOSFETs 27, 28. Using this as its starting point, the current sensing device 35, 36 creates current sensing signals CS1, CS2 (CS=Current Sense) which are fed to the control unit 36 and the are used for control and supervision of the functional sequence of the switching controller 21.

Furthermore a voltage sensing device 37 is provided which is connected to the drain terminals of the power MOSFETs 27, 28. The voltage sensing device 37 records the potentials V1, V2 at the terminals 22, 23 and thereby a differential voltage Vdiff falling at the switching controller 21. In this case the voltage sensing device 37 on the one hand detects the polarity of this differential voltage Vdiff and creates the digital signal Vdiff1 as a function of this. On the other hand the voltage sensing device 37 records the absolute value of this differential voltage Vdiff and outputs the amount of this differential voltage Vdiff as a ground-related voltage value Vdiff2. A reference voltage Vref is also required for the function of the voltage sensing device 37. The signals Vdiff1, Vdiff2 provided on the output side of the voltage sensing device 37 are fed to the control unit 36 for control and monitoring purposes.

The circuit arrangement in FIG. 3 further shows a function block 29 which contains the actual transfer gate. The transfer gate 29 is arranged in parallel to the switching controller 21 and thus connected between the input 22 and the output 23. The transfer gate 29 can be switched on or off using the control signal TGon of the control unit 36 is.

The function of the inventive switching device 20 shown in FIG. 3 is briefly explained below.

It is first assumed that the switching device 20 is open, meaning that the "On/Off" signal exhibits a low logical level. Let a potential V1 at input 22 be greater than the potential V2 at output 23. The transistors 27, 28 as well as a charge pump for activation of these transistors 27, 28 is switched off. For the switch-on process of the switching device 20 the control unit 36 now receives a control signal to close the switching device for example, by setting the "On/Off" signal to a high logical level.

1. Switch-on Process:

In a first step the potential difference Vdiff between input 22 and output 23 is equalized by means of the switching controller 21, before the switching controller 21 is completely closed in a second step.

2. Preparation:

Initially a voltage difference Vdiff2 and a voltage polarity Vdiff1 (Vdiff2>0, Vdiff1=HIGH) are measured by the voltage sensing device 37 and evaluated in the control unit 36.

3. The Following Decisions are Now Taken in the Control Unit 36:

The voltage difference Vdiff2 is greater than an upper threshold value. This results in a charge equalization being required by operating the switching controller.

The voltage difference Vdiff1 has a positive polarity. This results in transistor 27 being selected as switching controller transistor and transistor 28, which is operated here with reverse polarity, being switched on statically. Furthermore the current sensing signal CS2 for is selected for current sensing.

The transfer gate 29 initially remains switched off. If the control unit 36 was to determine that the voltage difference Vdiff2 is smaller than a lower threshold value, the process jumps directly at this point to Para. 5 below.

4. Switching Controller Mode:

On switch-on of transistor 27 the current through the inductor 24 continues to increase, so that the current sensing signal CS2, which maps the source-side current of transistor 28 and thereby the current from the inductor 24, also has a continuously increasing voltage. The current sensing signal CS2 is monitored against an upper limit value. If the charge current flowing through the controlled link of transistor 27 and thereby through the coil 24 reaches the upper limit value, the transistor 27 is then switched off. In addition the on duration of the transistor 27 is compared to a second upper limit value. The charge current through the inductor 24 now flows on through the free-wheeling diode 25, in which case it decreases in doing so. The current sensing signal CS2 is now monitored against a lower limit value of the charge current. If the load current reaches the lower limit value, the transistor 27 is switched on again. A triangular load current curve is thus produced in the inductor 24 which oscillates between an upper and a lower current limit value. This thus produces a current flow from the input 22 to the output of the switching controller arrangement 21 which has a triangular current curve.

5. Transition from Switching Controller Mode to Complete Switch-on:

If the switching controller 21 is operated for a long period in switching controller mode in accordance with Para. 4, then as a result the differential voltage Vdiff at switching controller 21 will reduce over time. This means that the charge time of the inductor 24 simultaneously increases. If this charge time reaches or exceeds an upper predetermined limit value, it can be assumed that the voltage difference Vdiff at the switching controller 21 is minimal. The transfer gate 29 arranged in parallel to the switching controller can now be closed without danger and thereby switched on. For these purposes transistor 27 of the switching controller 21 is now permanently switched on. Likewise transfer gate 29 is switched on via the signal TGon so that the entire switching device is now switched on. The control unit 36 now switches the "Switch ON" signal from a low logical level to a high logical level In this way the present switched-on switch state of the switching device is now signaled externally.

Figure 4:
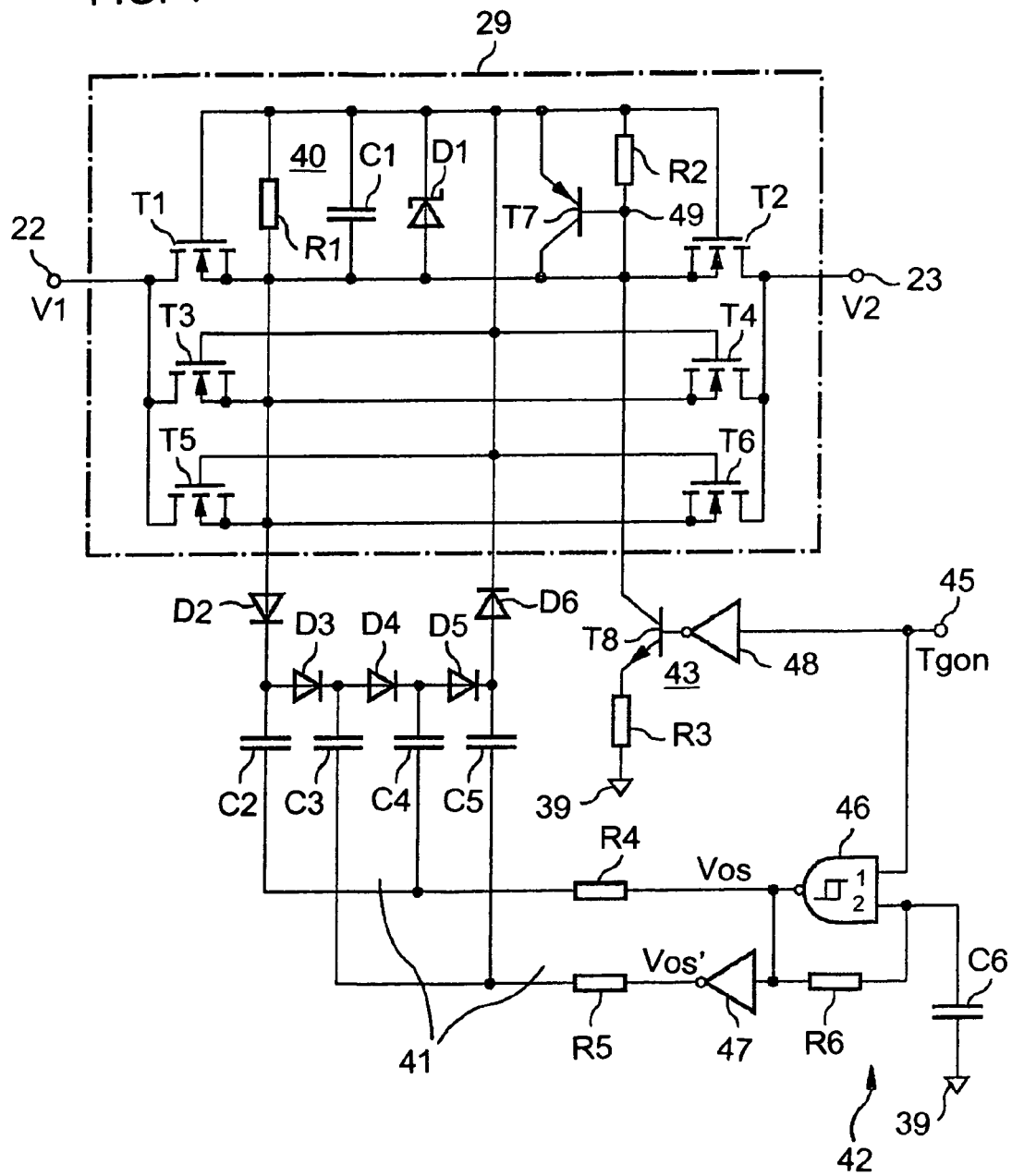
FIG. 4 a more detailed circuit diagram of a transfer gate of an inventive switching device with charge pump and activation circuit.

FIG. 4 shows, with reference to a more detailed circuit diagram, a transfer gate of an inventive switching device equipped with a charge pump and activation circuit.

The transfer gate 29 in the present exemplary embodiment features precisely three parallel-switched branches, with each branch featuring two power MOSFETs T1-T6. The transfer gate 29 essentially has the circuit structure of the transfer gate described with reference to FIG. 2.

Gate terminals and source terminals of transistors T1-T6 are coupled to each other via a gate protection circuit 40. The gate protection circuit 40 contains a parallel circuit comprising a capacitor C1, a resistor R1 and also a Zener diode D1. The parallel circuit protects the gate terminals of the transistors T1-T6 on the one hand against a negative gate potential and on the other hand against an overvoltage which could destroy the gate terminals and thereby render the transistors T1-T6 incapable of functioning.

A charge pump 41, a switchable oscillator 42 and a switch-off device 43 are further provided for activation of the transfer gate 29.

The switchable oscillator 42 contains a logic gate 46 as well as a capacitor C6 and a feedback resistor R6. The logic gate 46 exhibits a switching behavior susceptible to hysteresis when an input signal is coupled in to it. Advantageously the logic gate 46 is embodied as a Schmitt trigger circuit. The logic gate 46 features two input terminals, with a first input terminal being connected to the control connection 45 for coupling in the control signal TGon. The second input terminal is connected via capacitor C6 to a supply terminal 39 for a supply potential, for example the reference ground GND. A feedback resistor R6 is arranged between the second input terminal and the output of the logical gate 46.

The charge pump 41 is connected downstream from the switchable oscillator 42. The charge pump 41 contains an inverter 47, the resistors R4, R5, the capacitors C2-C5 and the diodes D2-D6. The charge pump 41 consists of a discharge path and a charge path. The charge path is arranged between the output of the switchable oscillator 42 and the control terminals of the transistors T1-T6 of the transfer gate 29. The discharge path is arranged between the source terminals of these transistors T1-T6 and the output of the switchable oscillator 42. The charge path consists of the inverter 47, the resistor R5 as well as the parallel circuit of the capacitors C3, C5, which are connected in series overall. The discharge path consists of the parallel circuit of the capacitors C2, C4 and the resistor R4, which are connected in series to each other. The diodes D2-D6 are provided for coupling the charge path and discharge path.

The switch-off device 43 contains an inverter 48, the transistors T7, T8 and the resistors R2, R3. The inverter 48 is connected on the input side to the terminal 45 for the control signal TGon. On the output side the inverter 48 is connected to the control connection of the transistor T8. The transistor T8 is connected on the emitter side via the resistor R3 to the supply terminal 39. On the collector side the transistor T8 is connected via the resistor R2 to the gate terminals of the transistors T1-T6. A potential at the tap 49 between the resistor R2 and the collector of the transistor T8 is used for activation of the transistor T7, of which the controlled link is arranged between the gate terminals and source terminals of the transistors T1-T6.

The functioning of the circuit arrangement depicted in FIG. 4 will be briefly explained below:

The polarity of the differential voltage Vdiff=V2−V1 falling at transfer gate 29 is undefined. For these reasons two of the power MOSFETs T1-T6 in each case must be connected in series as regards their controlled links to prevent an activation of the body diode inherently present in the relevant power MOSFETs T1-T6. To increase the current carrying capacity of the transfer gate 29, a number, in the example shown here, three branches with pairs of transistors T1-T6 are arranged in parallel to one another, with each branch of this parallel circuit then carrying a part of the total current. In this way a transfer gate 29 can be provided in a very simple and cost effective way which is in a position to switch very high currents ranging up to 1 kA. Commercially-available low-cost transistors T1-T6 (power MOSFETs) can advantageously be used for this purpose, which are designed to be used up to 100 A for example.

Since both the source terminals and also the gate terminals of these power MOSFETs T1-T6 are switched in parallel, by applying a sufficiently large positive gate source voltage—typically of around 10-15 V—the entire transfer gate 29 can be switched on.

The logic gate 46 advantageously exhibits a switching behavior which is susceptible to hysteresis at its inputs. If for example there is a control signal TGon at the first input terminal of the logic gate 46 which exhibits a high logical level, an oscillating signal occurs at the output of the logic gate 46 of which the oscillation period is determined by the values of feedback resistor R6 and capacitor C6.

This oscillating output signal Vos of the switchable oscillator 42 drives the inverter 47 such that at the output of the gate 46 and at the output of the inverter 47 there are now two square-wave signals Vos, Vos', displaced by 180° phases. These two signals, Vos, Vos now—decoupled via the two current-limiting resistors R4, R5—drive the phase-opposed charge pump 41. The reason for the phase opposition arises from the use for the diodes D2-D6.

Now, with each clock of the oscillator signal Vos, the charge of the supply voltage—which typically amounts to around 5 V—is shifted in the charge capacitor C1 by means of the capacitors C2-C5 and the diodes D2, D6. This means that a voltage builds up at the charge capacitor C1 arranged between the gate terminals and source terminals of the transistors T1-T6, through which the transistors T1-T6 are switched on accordingly.

The selected implementation of the charge pump 41 allows a direct-current-like decoupling of the input potentials of the charge pump, meaning of the signals Vos, Vos', and the output potential of the charge pump, meaning the source potential of the transistors T1-T6.

In addition the transistor T8 and thereby the transistor T7 are switched via the control signal TGon and the inverter 48. If the signal TGon is at a low potential, the transistor T8 is switched on, whereas it is switched off at a high potential. This means that the transistor T8 remains switched off when the charge pump 41 is activated. If the charge pump 41 is switched off by a change in level of the signal TGon from a high logical level to a low logical level, the transistor T8 is switched on. Thus the control voltage between the gate terminals and source terminals of the transistors T1-T6 is short circuited, so that these transistors T1-T6 are switched off. In this way it is possible for transfer gate 29 to switch off very quickly, meaning that it can move into the non-conducting state.

Figure 5:
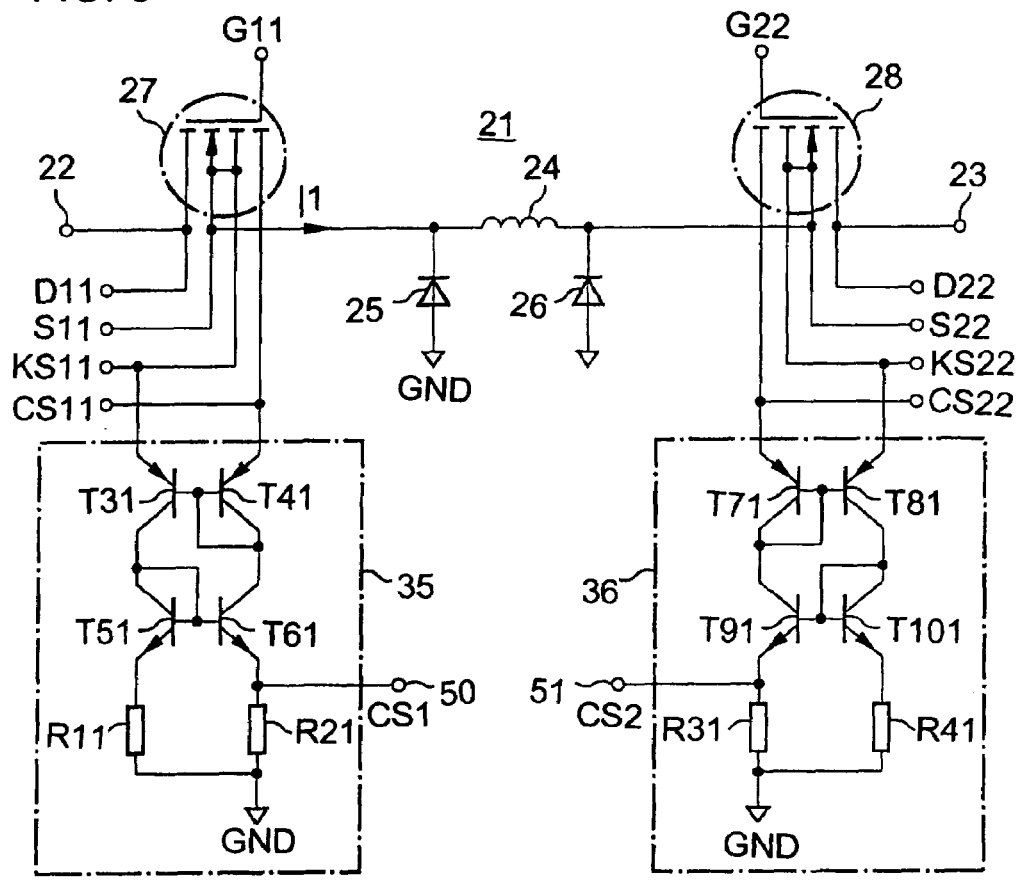
FIG. 5 a more detailed circuit diagram of a switching controller of the inventive switching device.

FIG. 5 shows a detailed circuit diagram of the switching controller of the inventive switching device from FIG. 3.

The switching controller 21 contains, as already mentioned, essentially the two transistors 27, 28 as well as the free-wheeling diodes 25, 26 and the inductor 24 arranged between them. A significant element of the switching controller 21 is its activation.

The transistor 27 arranged on the input side in the switching controller 21, together with the free-wheeling diode 25 and the inductor 24, form the basic elements of a known downward control. In the case of a signal coupled in on the input side via the input terminal 22 the diode 26 is thus inactive and the transistor 28 is switched on statically. If the transistor 27 is now switched on via the input signal V1 the current I1 through the inductor 24 increases constantly, driven by the voltage difference Vdiff=V2−V1 between input 22 and output 23. If this current I1 reaches a predetermined upper limit value, the transistor 27 then switches off and the current I1 through the inductor 24 now flows on through the free-wheeling diode 25. This causes current I1 to fall until a lower threshold value is reached. At this point transistor 27 switches on again and the process starts anew. As a result a current flow I1 from input 22 to output 23 is produced.

The current I1 which flows through the inductor 24, only flows through the transistor 27 as well during the charging-up phase. In the discharging phase the current I1 does not flow via the transistor 27, but instead via the free-wheeling diode 25. The current I1 flows simultaneously in both phases, i.e. in the charging phase and also in the discharging phase, through the inversely operated, statically switched-on transistor 28.

In the present exemplary embodiment the transistors 27, 28 are embodied as power MOSFETs, especially as N-channel power MOSFETs. Such power MOSFETs typically consist of a plurality of transistor cells. In this case each of the transistor cells contains an individual transistor, with the current carrying load paths of the different individual transistors being connected in parallel to each other. The parallel connection of these individual transistors thus produces a significantly higher current carrying capacity in accordance with the number of transistor cells.

Figure 6:
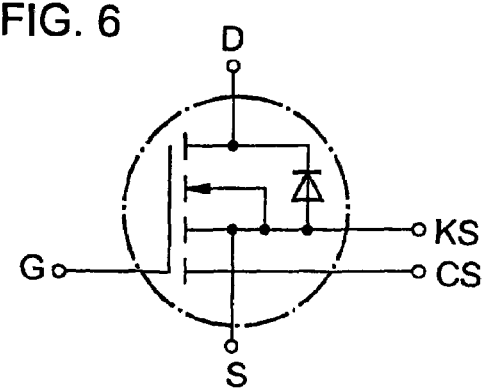
FIG. 6 the connections of a power MOSFET embodied as a measurement transistor for a switching controller from FIG. 5.

The transistors 27, 28 are preferably embodied as sense-MOSFETs 27, 28 in this case. FIG. 6 shows the terminal assignment of transistors 27, 28 embodied as such a sense MOSFET, in which case the terminal assignment should correspond to that shown in FIG. 5.

Such a sense MOSFET 27, in addition to its usual function, also offers the option of measuring a current via its controlled link. A sense MOSFET 27—like a conventional MOSFET—features a gate terminal G for control of the current flow as well as a source terminal S and a drain terminal D, via which the controlled current flows. In addition, with a sense-MOSFET a smaller proportion of the transistor cells are equipped with their own CS (CS=Current Sense) terminal, so that a lower proportion of the source-side load current I1 can be tapped off. A potential at terminal KS (KS=Kelvin Source) forms the reference of the current sensing. It is thus possible, via terminal KS, to a certain extent in the style of a four-wire measurement, to avoid an error entry through a voltage drop which occurs in the resistance of the bond wire at the terminal S1. To implement a measurement accuracy which is as high as possible the voltage difference between the terminals CS and KS must however be as small as possible, ideally very much smaller than 100 mV. This requires an input impedance of the current sensing circuit which is as small as possible, which is also guaranteed with a sense MOSFET in accordance with FIG. 6.

The particular advantage in using a sense MOSFET according to FIG. 6—as opposed to a measurement of the voltage drop at a measurement resistor (shunt resistor)—lies in the significantly lower power dissipation, since only a very small part of the source current is included for forming the measured values. A sense MOSFET typically has a few 10,000-100,000 transistor cells. For a sufficiently representative current measurement it is fully sufficient here just to include a few of these transistor cells for the current sensing.

Current sensing devices 35, 36 are provided in each case for current sensing at transistors 27, 28. The current sensing device 35 contains two measurement paths, which are connected on one side to a supply terminal 39 with the reference potential and on the other side are connected to the measurement terminals KS11, CS11 of the sense MOSFET 27. The first current sensing path consists of the resistor R11 as well as the controlled paths of the transistors T51, T31, which are connected to each other in series and are arranged between the supply connection 39 and terminal KS11. The second current sensing path consists of the resistor R21 as well as the controlled paths of the transistors T61, T41, which are arranged in series between the supply connection 39 and terminal CS11. The transistors T51, T61 as well as the transistors T31, T41 are each arranged in a current balancing circuit, with the transistors T51 and T41 forming the transistor diode of the relevant current balancing element T51, T61; T31, T41 in each case. A tap between the resistor R21 and the transistor T61 forms the output terminal 50, at which the current sensing signal CS1 can be tapped.

The measurement of a load current flowing through transistor 27 is undertaken on the basis of a reference potential KS11, which—depending on the level of the external potentials V1, V2 applied at the terminals 22, 23—varies between a minimum value and around 60 V. For improved further processing in the control unit 30 a potential shift of the current sensing signal CS1 is now undertaken. This can be implemented in an especially elegant way by using the current balancing circuits arranged in each current sensing device 35. In this case the input impedance of the current sensing circuits 35 or of the current balancing circuits must be as low as possible, in order to tap a suitable current sensing signal from the sense MOSFET 27. The current sensed can then be converted into a potential CS1 suitable for further processing by means of the resistor R21 which can be tapped at output 50 as a current sensing signal CS1.

The current sensing device 36 has an equivalent structure to the current sensing device 35. However it should be noted here that the transistor 28 will be operated inversely and therefore the terminals of the current measurement circuit at transistor 28 are reversed compared to normal operation.

Figure 7:
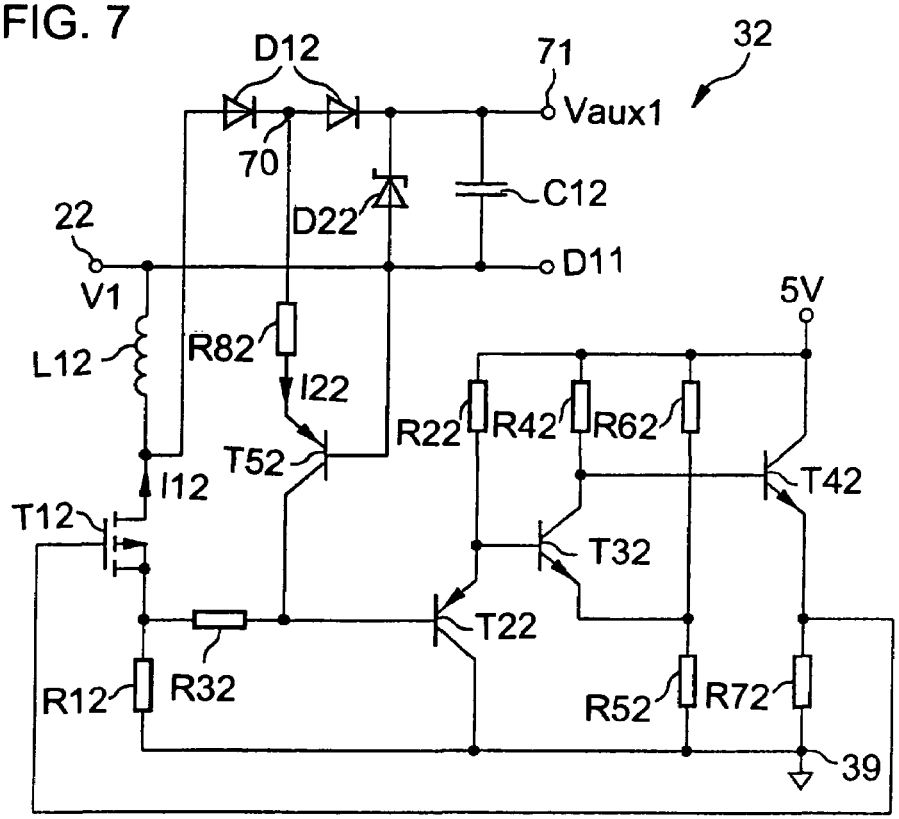
FIG. 7 a circuit diagram for showing the auxiliary power source for supplying the gate control circuit of the switching controller from FIG. 5.

FIG. 7 shows the circuit diagram of an auxiliary power source for supplying the gate control device from FIG. 3, The auxiliary power source 32 features a transistor T12, the inductor L12 and the double diode D12 which in the circuit from FIG. 7 form the basic components of a downward controller.

If transistor T12 is switched on, as a result of a high potential at the emitter of the transistor T42, an increasing current flows through the inductor L12. This current I12 flows at the same time through the current sensing resistor R12. The voltage produced from this is directed via resistor R32 to the base of transistor T22. The connection of a PNP bipolar transistor T22 with an NPN bipolar transistor T32 largely compensates for the influence of the base emitter diode of transistor T32, so that overall a transistor with a very low base emitter voltage difference is produced. These transistors T22, T32 connected cascaded thus to a certain extent form a "supertransistor".

The emitter potential of the transistor T32 is set by the voltage divider, consisting of the resistors R52, R62, to an upper threshold value. If the current I12 through transistor T12 is close to zero, the base potential of the "supertransistor" T22, T32 is also zero and the transistor T12 blocks. The collector potential of this "supertransistor" T32, T22 is raised to around 5 V via the resistor R42, with the result that the basic voltage of the transistor T42 connected to it also increases. The emitter voltage of the transistor T42 thus also increases to around 4.3 V. This transistor T42 is coupled on the emitter side to the control connection of transistor T12. The given voltage value of 4.3 V is sufficient to switch on the T12. With increasing current I12 through the elements L12, T12, R12 the voltage falling via the resistor R12 thus increases and thereby also the voltage falling via the resistor R32 for activation of the base of the "supertransistor" T22, T32. If a value is now reached which corresponds to the upper threshold value set at the emitter of transistor T32, transistor T32 switches on, at which point its collector potential drops. As a result of this the emitter voltage of transistor T42 drops and with it the gate voltage of transistor T12. Transistor T12 then switches off. Driven by the induction voltage over the coil L12 functioning as a choke, the voltage at the drain terminal of the transistor T12 will now rise until the double diode D1 begins to conduct current. The energy stored in the inductor L12 is now discharged via the capacitor C12 or respectively on reaching the breakdown voltage of the Zener diode D22 via this diode D22.

At the same time the potential at the center tap 70 of the double diode D12 increases via the potential V1 present at input 22, at which point transistor T52 becomes conductive and current I22 limited by the resistor R82 flows over the controlled link of transistor T52. This current I22 creates a voltage increase at resistor R32 which switches on transistors T22, T32. This keeps the base potential of transistor T42 at a low value and as a result of this transistor T12 remains switched off.

If inductor L12 is now completely discharged, the voltage over the inductor L12 collapses. Transistor 52 likewise blocks and the voltage at resistor R32 drops towards zero. This means that the "supertransistor" T22, T32 again switches off, at which point its collector potential rises. The emitter voltage of the transistor T42 now also increases and transistor T12 will be switched on again. This creates a triangular current in the inductor L12 which oscillates backwards and forwards between the upper threshold value and zero. In the charge phase the inductor L12 takes charge from the potential V1 present at input 22 and in the discharge phase this charge is passed on to the storage capacitor C12. The potential Vaux1 thus produced can be tapped at the output 71 and supplies the gate control device 31 of a power MOSFET in case, in the present example the power MOSFET 27.

Figure 8:
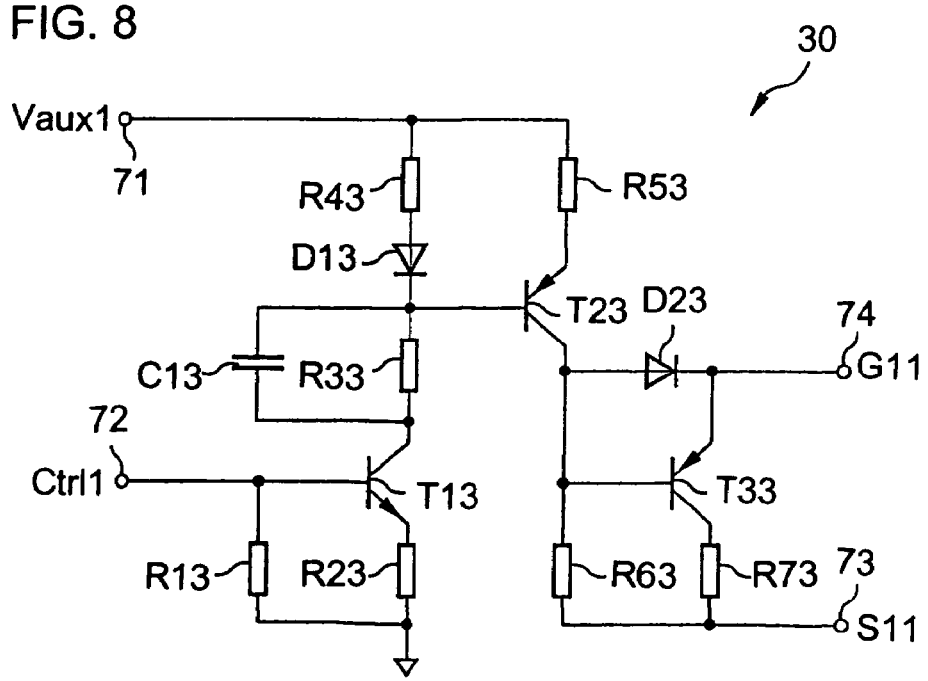
FIG. 8 a circuit diagram of a gate control circuit for control of the switching controller from FIG. 5.

FIG. 8 shows a circuit diagram of a gate-control device 30 for controlling the switching controller from FIG. 3.

The gate control device 30 can be supplied with a supply potential Vaux1 which can be decoupled at the supply terminal 71 created by the auxiliary voltage source 32. The gate control device 30 further features another control connection 72 which is coupled to the control device 36 and via which a control signal Ctrl1 can be decoupled. Using the level of this signal Ctrl1 the control unit 36 of the gate control device 30 determines the switching status of the power MOSFET 27. If the control signal Ctrl1 has a low logical level (LOW) transistor T13 is switched to zero current. The transistor T23 is then also switched off, since its base emitter voltage is zero in this case. The resistor R63 defines the base potential of the transistor T33 on the source voltage of the power MOSFET 27, at which point the transistor T33 switches and the potential at terminal 74 largely approaches the value of the potential at terminal 73. The terminal 73 is connected to the source terminal S11, the terminal 74 is connected to the gate terminal G11 of the power MOSFET 27. As a result the gate source voltage of the power MOSFET 27 is approximately zero so that this MOSFET 27 is switched off.

If the control signal Ctrl1 at the control input 72, controlled by the control unit 36, jumps to a high logical level (HIGH), transistor T13 becomes conductive. Transistor T13 operates in connector with resistor R23 as a current source, for which the value is essentially determined by the level of the control signal Ctrl1 and the value of the resistor R23. The load current through this transistor T13 is used for base activation of the transistor T23, which is configured by means of the resistors R43, R53 and the diode D13 as current balancing element. The current flow through transistor T23 now charges the gate capacitor of the power MOSFET 27 via terminal 74. This means that the gate source voltage (voltage between the terminals 73, 74) of the power MOSFET 27 and the power MOSFET 27 is finally switched on.

If the control signal Ctrl1 jumps to a low logical level, transistor T13 switches off, at which point the transistor T23 is also switched to no-load. Transistor T33 is now switched to conducting via resistor R63, at which point the gate source voltage of the MOS transistor 27 is controlled via the transistor T33 and the resistor R73 is controlled to approximately 0 V. Transistor T27 then switches off.

In the same way the power MOSFET 28 is switched on via an equivalently embodied gate control device 32 or is switched off.

Figure 9:
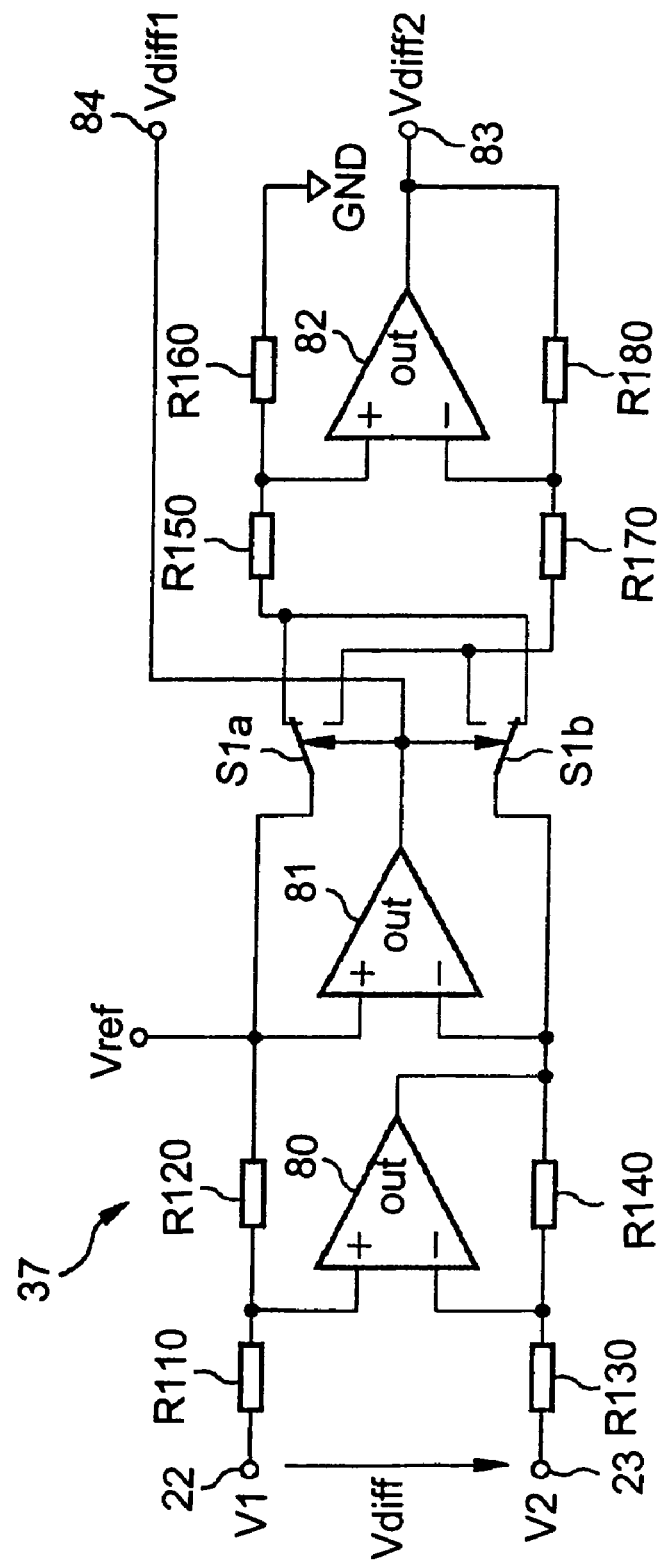
FIG. 9 a circuit diagram of the voltage sensing device of the inventive switching device with polarity detection and absolute value generation.

FIG. 9 shows a circuit diagram of the voltage sensing device 37 from FIG. 3.

The voltage sensing device 37 essentially consists of a first differential amplifier 80, a voltage comparator 81, a two-pole switch S1a, S1b and a second differential amplifier 82.

The first differential amplifier 80 is connected on the input side via the resistor R110, R130 to the terminals 22, 23. The first differential amplifier 80 thus converts the differential voltage Vdiff=V2−V1 present between the terminals 22, 23 to a voltage related to a reference voltage Vref. For the case in which the first differential amplifier 80 is supplied with a supply voltage of 5 V, a reference voltage Vref=2.5 V is advantageous, since the measured differential voltage Vdiff can features both a positive and also a negative polarity. Let a positive polarity of the differential voltage Vdiff be given below.

The voltage difference Vdiff between the terminals 22, 23 is recorded in the differential amplifier consisting of the resistors R110, R120, R130, R140 and the first differential amplifier 80 and is converted into a DC voltage related to a predetermined reference voltage Vref. If the potential difference amounts to 0 V, a voltage Vref can be tapped off at the output of the differential amplifier 80.

It should further be noted that the input potentials V1, V2 can under some circumstances have high values in the range of around 60 V, but the differential voltage Vdiff=V2−V1 with increasing charge equalization becomes relatively small, for example is in the range of less than 1 V. For these reasons the first differential amplifier 80 must feature the best possible common-mode rejection.

A voltage comparator 81 connected downstream from the first differential amplifier 80 now compares the output voltage of the first differential amplifier 80 with the reference potential Vref. Regardless of whether this output voltage is greater than or less than the reference voltage Vref, the voltage comparator 81 activates one of the two controllable switches S1a, S1b on the output side. The controllable switches S1a, S1b are coupled to each other and can for example be embodied as a CMOS changeover switch.

This controlled switchover of the switches S1a, Sib coupled to each other always activates a downstream, second differential amplifier 82 with a signal of the same polarity. In the present exemplary embodiment the second differential amplifier 82 is always activated with a positive input voltage. The second differential amplifier 82 is connected in a circuit with the resistors R150, R160, R170, R180. Since the reference potential GND of the second differential amplifier 82 is a ground potential GND (not shown in FIG. 9), the second differential amplifier 82 thus creates the absolute value of the differential voltage Vdiff coupled-in on the input side in the voltage sensing device 37 related to the reference ground. This signal Vdiff2 present on the output side at the second differential amplifier 82 can be tapped off at the output terminal 83 and can thus be fed to the control unit 36. The signal Vdiff2 thus forms a voltage sensing signal which specifies the absolute value or the amount of the differential voltage Vdiff.

The output signal of the comparator 81 equally forms the signal Vdiff1, which can be tapped off at the output terminal 84 and is directed to the control unit 36 of the differential voltage Vdiff. The signal Vdiff1 thus forms a voltage sensing signal, which specifies the polarity or the leading sign of the differential voltage Vdiff.

Figure 10:
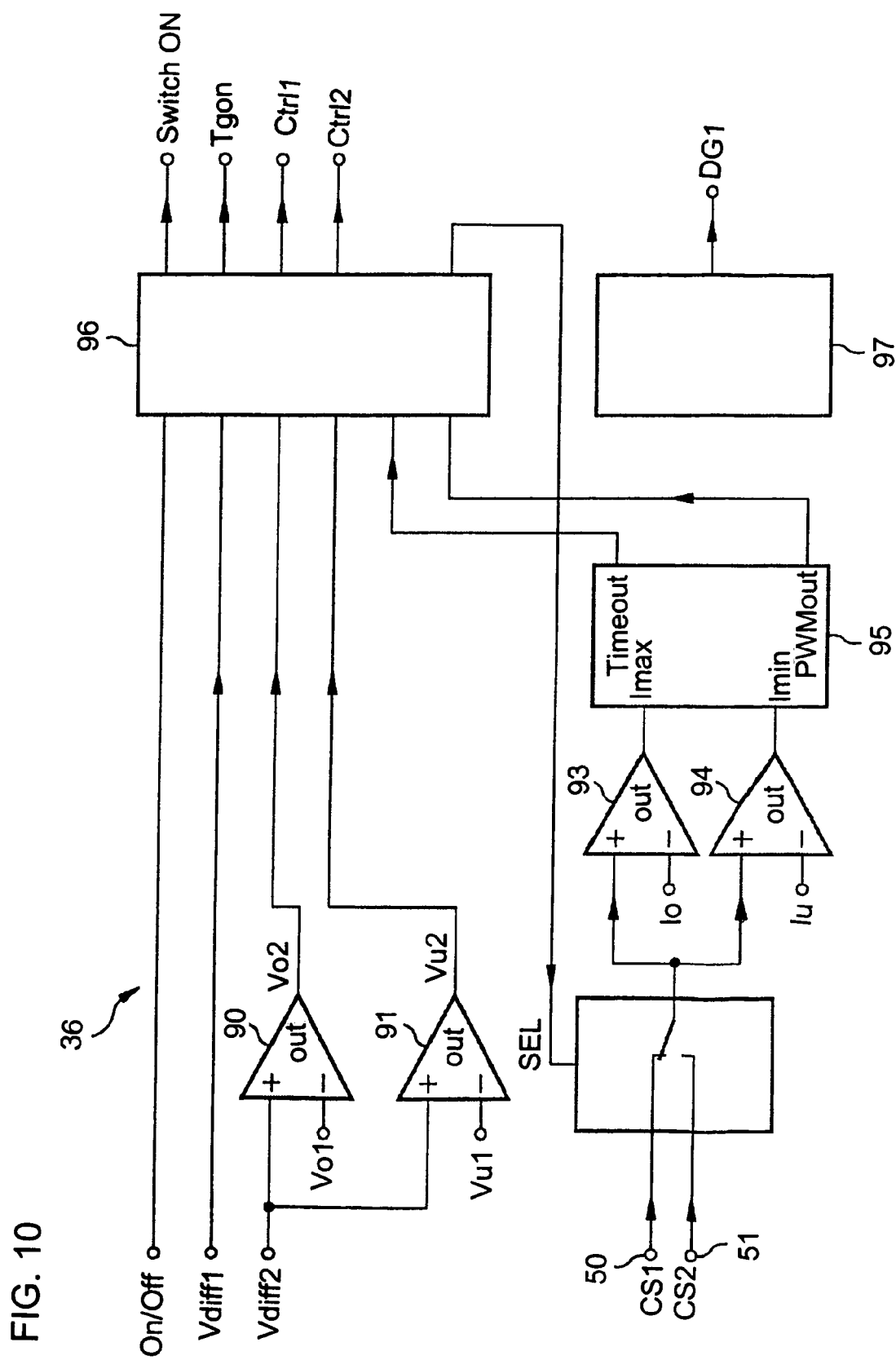
FIG. 10 a circuit diagram for the sequence control circuit of the inventive switching device.

FIG. 10 shows, with reference to a block diagram, the structure of the control unit 36 for an inventive switching device.

The control unit 36 consists of two comparators 90, 91, a switchover unit 92, two further comparators 93, 94, a PWM generator 95 with time monitoring, a logic unit 96 and a diagnosis unit 97.

The comparators 90, 91 compare the absolute value of the differential voltage Vdiff2 with an upper voltage value Vo1 and a lower voltage value Vu1 and from this creates the two logic signals Vo2, Vu2, which will be routed to the logic unit 96. If the potential Vdiff2 is greater than Vo1, the output signal Vo2 of the comparator 90 has a high logical level. If the value of the potential Vdiff2 is smaller than Vu1, the output signal Vu2 has a low logical level.

The current sensing signals CS1, CS2 of the current sensing devices are routed to the switchover unit 92. The switchover unit 92 is further activated via a control signal SEL of the logic unit 96. Controlled by this control signal SEL the switchover unit 92 directs the current sensing signal CS1 or the current sensing signal CS2 to the downstream comparators 93, 94.

These comparators 93, 94 are embodied as current comparators. The comparator 93 compares the signal coupled in on the input side (CS1 or CS2) with an upper current value and on the output side creates the current signal Imax. The comparator 94 compares the signal (CS1 or CS2) coupled in on the input side with a lower current value I and creates the current signal Imin. If the current sensing signal CS1 or CS2 is greater than Io, the current signal Imax has a high logical level. If the current sensing signal CS1 or CS2 is less than I, the current signal Imin has a low logical level. The signals Imax, Imin are coupled into a PWM generator 95 connected downstream from the comparators 93, 94.

The PWM generator 95 creates at its PWM output a pulse-value modulated signal PWMout depending on the signal level of the signals Imax, Imin. If the signal Imax has a high logical level, a signal PWMout with a low logical level is present at the PWM output of the PWM generator 95. This is the signal to indicate that the upper current value Io was exceeded and that the transistor 27, 28 selected for PWM operation must be switched off. The signal level PWMout at the PWM-output of the PWM generator 95 is retained until such time as the level of the signals Imin jumps from a high logical level to a low logical level. This signal changeover is the indication that the lower current value I was undershot and that the transistors 27, 28 selected for PWM operation must be switched on. With the change of level of the signal Imin from the low logical level LOW to the high logical level HIGH the signal PWMout at the PWM output of the PWM generator 95 thus jumps back to a high logical level.

In one embodiment the PWM generator 95 further features a monitoring circuit which compares the on duration of the signal at the PWM output PWMout with an upper limit value and if this limit value is exceeded, creates a "Timeout" signal at the timeout output of the PWM generator 95. This "Timeout" signal is coupled into a corresponding timeout input of the logic unit 96.

The logic unit 96 controls the further functional sequence of the control unit 36 with reference to the described signals as well as on the basis of the external "On/Off" signal. The logic unit 96 detects on the basis of the size and the leading sign of the differential voltage Vdiff whether the power switch 27, 28 must be operated in switching controller mode. Furthermore the logic unit 96 decides which of the two power transistors 27, 28 are to be activated as switching control transistors and which are to be switched on completely.

In the present exemplary embodiments it has been assumed in each case that the power transistor 27 will be operated as a switching control transistor and the power transistor 28 then functions as a statically switched-on transistor. If the voltage difference V1–V2 is negative, the operation of these two transistors 27, 28 is reversed.

The logic unit 96 decides which of the two current sensing signals CS1, CS2 is to be used and activates the changeover switch 92 accordingly. The logic unit 96 forwards the pulse width modulated output signal PWMout which can be tapped off at the PWM output of the PWM generator 95 via the control outputs Ctrl1, Ctrl2 to the relevant power transistors 27, 28 selected as switching control transistors.

The logic unit 26 further detects on the basis of the signals Vu2 or "Time out" respectively when the differential voltage Vdiff is small enough or when the charge equalization is far enough advanced to allow the switching controller 21 to be closed without any danger and thereby to switch on the transfer gate 29. Subsequently the logic unit 96 signals to an external control unit not shown in the Figures of the drawing the new switching state by changing the level of the output signal "Switch ON".

FIG. 10 further shows, as a component of the control unit 36, a diagnosis device 97, for which no further details are provided however, since known methods of operation can be used here. Essentially the diagnosis unit monitors 97 a correct function of the circuit parts and circuit elements described above as well as the correct functional sequence overall. The diagnosis unit 97 can also—such as in the event of an external error, such as a short circuit at one of the inputs 22, 23—prevent the inventive switching device 20 or the power MOSFETs 27, 28 being switched on. The output signal DG1 present at the output of the diagnosis device signals to an external control unit whether the switching device 20 or the power MOSFETs 27, 28 operated in switching controller mode are functioning correctly. In an expanded embodiment with a bidirectional data bus not shown the communication of detailed information about the inventive switching device 20 is possible in the event of an error in order to simply a repair to this circuit in this way.

Although the present invention has been described above on the basis of a concrete preferred exemplary embodiment in great detail, it can be changed and modified in a wide variety of ways.

Thus the invention is not restricted to the concrete circuit implementations described above. Instead the transfer gate, the switching controller, the control unit, the gate controllers, the current sensing devices, the voltage sensing device, etc. can obviously be embodied in a plurality of different circuit variants, without deviating from the basic principle of the present invention.

The object of the invention is the provision of a power switch which features a transfer gate expanded by a switching controller. A conventional downward controller can be used here as a switching controller, as has been explained above. Other types of controller, such as an upward controller for example, would also be conceivable in addition or as an alternative.

Thus the invention is also not just restricted to the actual components used. Instead for example by swapping the conductivity types N for P and vice-versa many other switching examples can be specified. Here too the transistors do not necessarily have to be embodied as bipolar transistors or MOS transistors, but any other transistor types, for example JFETs, thyristors, IGBTs or such like can be used can be connected to one another. It is taken as read that the resistors, capacitors, coils, diodes can be replaced by any resistive elements, capacitive elements inductive elements or rectifying elements. In addition the transistors can be replaced by any controlled switch or amplifying elements depending on the operating modes in which these are to be operated.

Nor is the invention restricted to specific values. Such figures have merely been given to aid understanding, but should not however restrict the invention in any way.

We claim:

1. A switching device for bidirectional charge transfer between an energy accumulator and an electrical load/generator in an electrical system, comprising:
    a first terminal coupled to the load/generator;
    a second terminal coupled to an energy source;
    a controllable transfer gate formed with a first load current carrying path connected between said first and second terminals, said transfer gate having a parallel circuit of a plurality of series circuits each formed of two series-connected controllable power transistors; and
    a controllable switching controller capable of being operated bidirectionally, said switching controller including a second load current carrying path connected between said first and second terminals and in parallel with said first load current carrying path.

2. The switching device according to claim 1, wherein the electrical system is a motor vehicle on-board electrical system, the energy accumulators are capacitive energy accumulators, and the electrical load/generator is an integrated starter-generator.

3. The switching device according to claim 1, wherein said switching controller is a stepdown controller.

4. The switching device according to claim 1, wherein said switching controller includes at least two controllable first switches having controlled paths connected in series with one another, an inductive energy accumulator connected between a relevant first load connection of said first switch and connected in each case to a terminal of said inductive energy accumulator via a free-wheeling diode to a supply terminal for a supply potential.

5. The switching device according to claim 4, wherein said first switches are current-sensing transistors.

6. The switching device according to claim 5, wherein said first switches are sense MOSFETs.

7. The switching device according to claim 1, wherein said transfer gate includes a parallel circuit formed of controllable second switches, with two of said second switches having controlled paths connected in series and defining a load path in each case, with control terminals of said second switch connected to each other, with first load connections of said second switch connected to each other, and with second load connections of said second switches connected either to said first terminal or to said second terminal.

8. The switching device according to claim 7, wherein said first and/or said second switches are power switches.

9. The switching device according to claim 8, wherein said first and/or said second switches are power MOSFETs.

10. The switching device according to claim 9, wherein said first and/or said second switches are n-channel power MOSFETs.

11. The switching device according to claim 7, wherein said first switches and/or said second switches have source terminals forming first load terminals and drain terminals forming second load terminals.

12. The switching device according to claim 7, wherein said transfer gate includes a gate protection circuit, connected between said control terminals and said first load terminals of said second switches and configured to protect said control terminals of said second switches from an overvoltage.

13. The switching device according to claim 7, wherein said transfer gate includes a switch-off device, and said switch-off device, for switching off said transfer gate, short-circuits said control terminals and said first load terminals of said second switches and thereby switches off said second switches.

14. The switching device according to claim 7, which comprises a switchable oscillator for activation of said second switches a switchable oscillator, and a charge pump connected downstream of said oscillator for activating said control terminals of said second switches with a control signal.

15. The switching device according to claim 14, wherein said oscillator is a Schmitt trigger circuit.

16. The switching device according to claim 7, which comprises at least one current sensing device connected to at least one of said first switches and configured to tap off a signal derived from the current through said load path of the respective said first switch and, in dependence thereof, to provide a current sensing signal at an output of said current sensing device.

17. The switching device according to claim 1, which comprises a scheduler circuit configured to control a function of said switching controller and of said transfer gate.

18. The switching device according to claim 17, which comprises at least one gate control circuit having an input connected to said scheduler circuit, and wherein said gate control circuit is configured to activate a control connection of at least a first switch in dependence on a control signal from said scheduler circuit.

19. The switching device according to claim 18, which comprises at least one auxiliary voltage source having an input side connected to said first terminal or said second terminal, and wherein said auxiliary voltage source is connected between a first supply connection with a first supply potential and a second supply connection with a second supply potential and carries an auxiliary supply potential for supplying said gate control circuit.

20. The switching device according to claim 1, which comprises a voltage sensing device having an input side coupled to said first and second terminals and an output side, and wherein said voltage sensing device is configured to sense a differential voltage between said first and second terminals and to output a signal derived from the differential voltage at said output side.

21. The switching device according to claim 20, wherein said output side of said voltage sensing device includes a first output carrying a signal derived from an amount of the differential voltage measured between the first and second terminals, and a second output carrying a signal derived from a leading sign of the differential voltage measured between the first and second terminals.

22. The switching device according to claim 20, wherein said voltage sensing device includes a differential amplifier with a high common-mode rejection on the input side, said differential amplifier having an input receiving the differential voltage, and wherein a comparator is connected at an output of said differential amplifier for comparing an output signal of the differential amplifier with a reference potential.

23. The switching device according to claim 20, which comprises a scheduler circuit configured to control a function of said switching controller and of said transfer gate, said scheduler circuit having an input side connected to output terminals of said voltage sensing device and/or said current sensing device and evaluates the measured currents and voltages.

24. The switching device according to claim 1 configured as an integrated switching device.

25. A motor vehicle electrical network, comprising:
   at least two energy accumulators;
   an integrated starter-generator mechanically coupled to an internal combustion engine, said starter-generator, in a generator mode, charging at least one of said energy accumulator and, in a motor mode, configured to be driven by way of energy stored in at least one of said energy accumulators;
   a bidirectionally operable AC/DC converter connected between said energy accumulators and said integrated starter-generator; and
   a switching device according to claim 1 connected between a DC terminal of said AC/DC converter and each of said energy accumulators.

26. The motor vehicle electrical system according to claim 25, wherein said energy accumulators are physically separated from one another in operation.

27. The motor vehicle electrical system according to claim 25, which comprises at least one switching device for physical separation of said energy accumulators.

28. The motor vehicle electrical system according to claim 25, wherein said energy accumulators include a first energy accumulator embodied as an accumulator and a second energy accumulator embodied as a double-layer capacitor.

29. The motor vehicle electrical system according to claim 28, wherein said switching device is connected between said double-layer capacitor and said DC terminal of said AC/DC converter.

30. The motor vehicle electrical system according to claim 25, which comprises an intermediate circuit capacitor for buffering a switched voltage connected between said DC terminal of said AC/DC converter and said at least one switching device.

31. A method of operating a switching device, comprising:
   providing a switching device according to claim 1, wherein the switching controller and the transfer gate are initially open;
   wherein a first potential at an input of the switching device is greater than a second potential at an output of the switching device;
   closing the switching device by applying a first control signal to the switching device;
   initially operating the switching controller in a switching controller mode to reduce a differential voltage dropping across the switching device; and
   when the differential voltage is largely balanced out, completely closing the switching controller and switching the transfer gate on.

32. The method according to claim 31, which comprises measuring and evaluating the differential voltage.

33. The method according to claim 31, which comprises, based on a measured differential voltage, generating a first voltage sensing signal as a measure of an amount of the differential voltage and generating a second voltage sensing signal as a measure for a polarity of the differential voltage.

34. The method according to claim 31, which comprises equalizing a charge between the output and the input of the switching controller by operating the switching controller in switching controller mode, provided a first voltage measurement signal exhibits a voltage difference that is greater than an upper threshold value.

35. The method according to claim 31, which comprises selecting a transistor coupled to the input as a switching controller transistor and operating the transistor coupled with the output in a static switched-on state if a second voltage sensing signal indicates a positive polarity of the differential voltage.

36. The method according to claim 31, which comprises carrying out the following steps to iteratively in switching controller mode:
   measuring a load current through the controlled path of a transistor connected to the input and through an inductor;
   monitoring a measured load current against an upper limit value;
   switching the transistor off when the load current exceeds the upper limit value;
   monitoring the measured load current against a lower limit value; and
   switching the transistor back on when the charge current drops below the limit value.

37. The method according to claim 31, which comprises, when the first voltage measurement signal exhibits a voltage difference below a lower threshold value, permanently switching on the transistor of the switching controller connected to the input and/or switching on the transfer gate connected in parallel with the switching controller.

38. The method according to claim 31, which comprises, when a charge time of an inductor of the switching controller falls below a predetermined time limit value in switching controller mode, permanently switching on the transistor of the switching controller connected to the input and/or switching on the transfer gate connected in parallel with the switching controller.

39. The method according to claim 31, which comprises, based on the measured differential voltage, detecting with the device when the differential voltage is small enough or when the charge equalization between the output and the input has progressed far enough respectively to perform a permanent closure of the switching controller and switch over to the transfer gate.

40. The method according to claim 31, which comprises monitoring circuit parts of the switching device for respective correct functioning and/or monitoring for errors in a functional sequence, and wherein, in an event of a detected error, not switching on the switching device.

41. The method according to claim 31, which comprises transferring a current switching state of the switching device in each case by way of a status signal to an external control unit and displaying the current switching state at the external control unit.

* * * * *